Dec. 12, 1944.  R. STEVENSON  2,364,672
AERIAL PROPULSION
Filed March 6, 1939  7 Sheets-Sheet 1

INVENTOR.
Robert Stevenson
BY Barlow & Barlow
ATTORNEYS.

Dec. 12, 1944. R. STEVENSON 2,364,672
AERIAL PROPULSION
Filed March 6, 1939 7 Sheets-Sheet 2
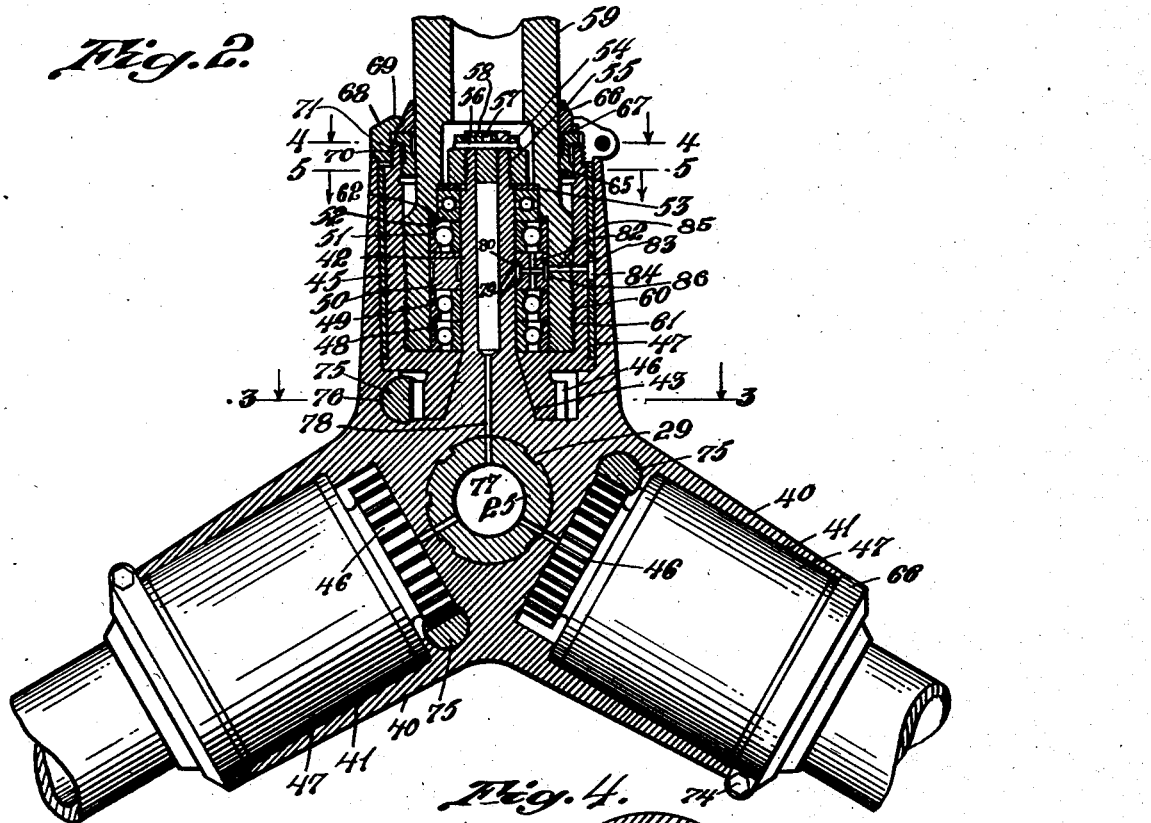
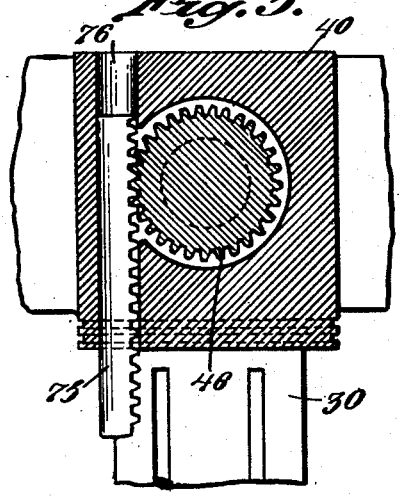
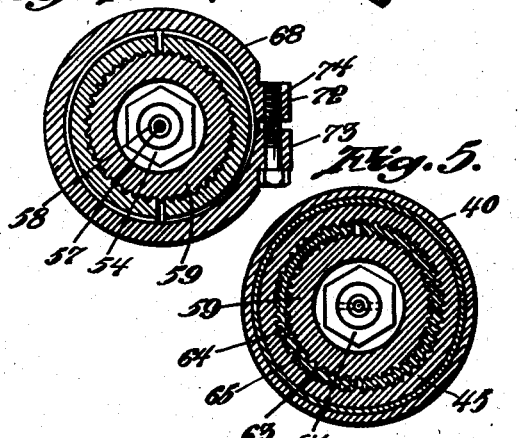
INVENTOR.
Robert Stevenson
BY Barlow & Barlow
ATTORNEYS.

Dec. 12, 1944.  R. STEVENSON  2,364,672
AERIAL PROPULSION
Filed March 6, 1939  7 Sheets-Sheet 3
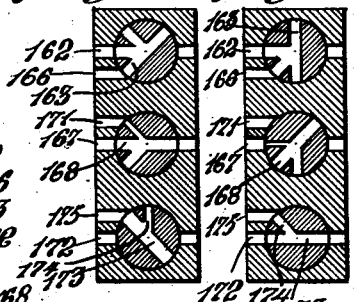
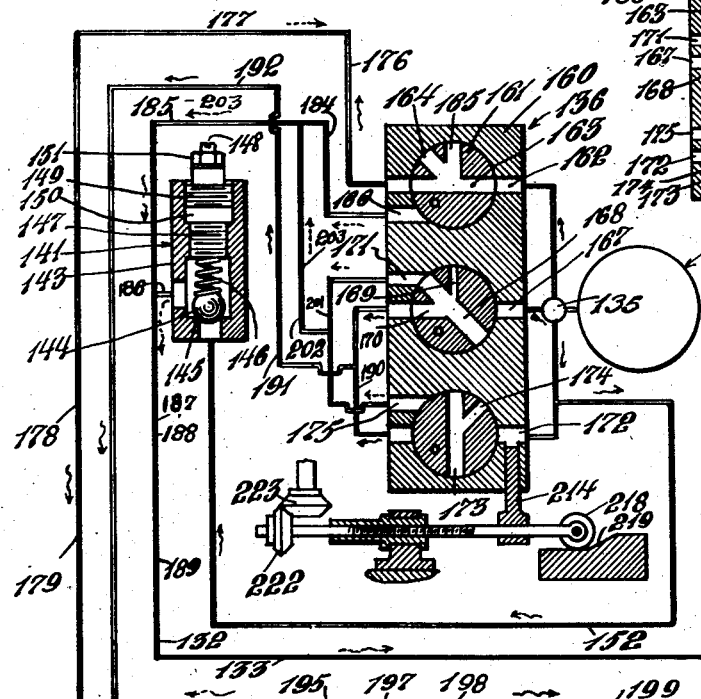
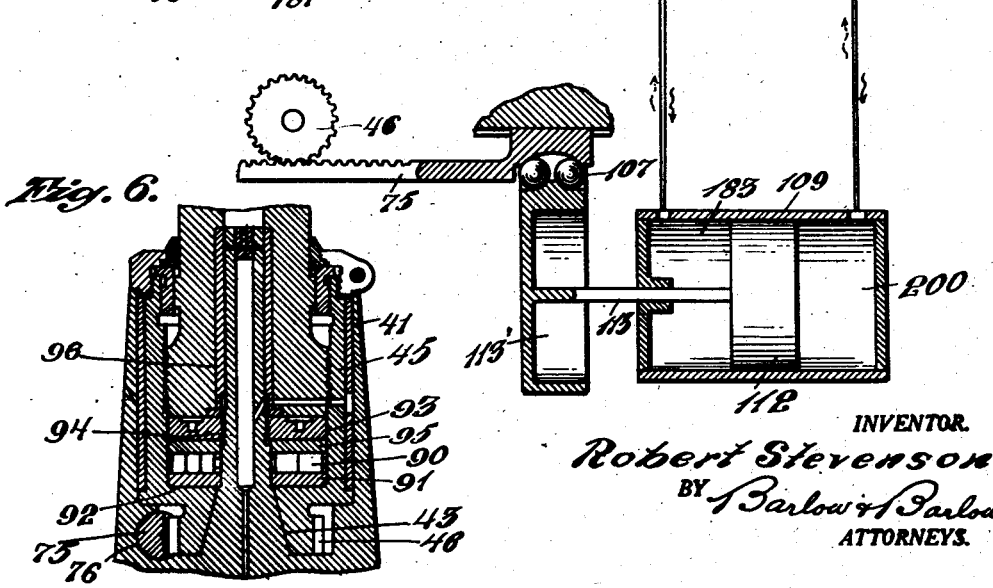
INVENTOR.
Robert Stevenson
BY Barlow & Barlow
ATTORNEYS.

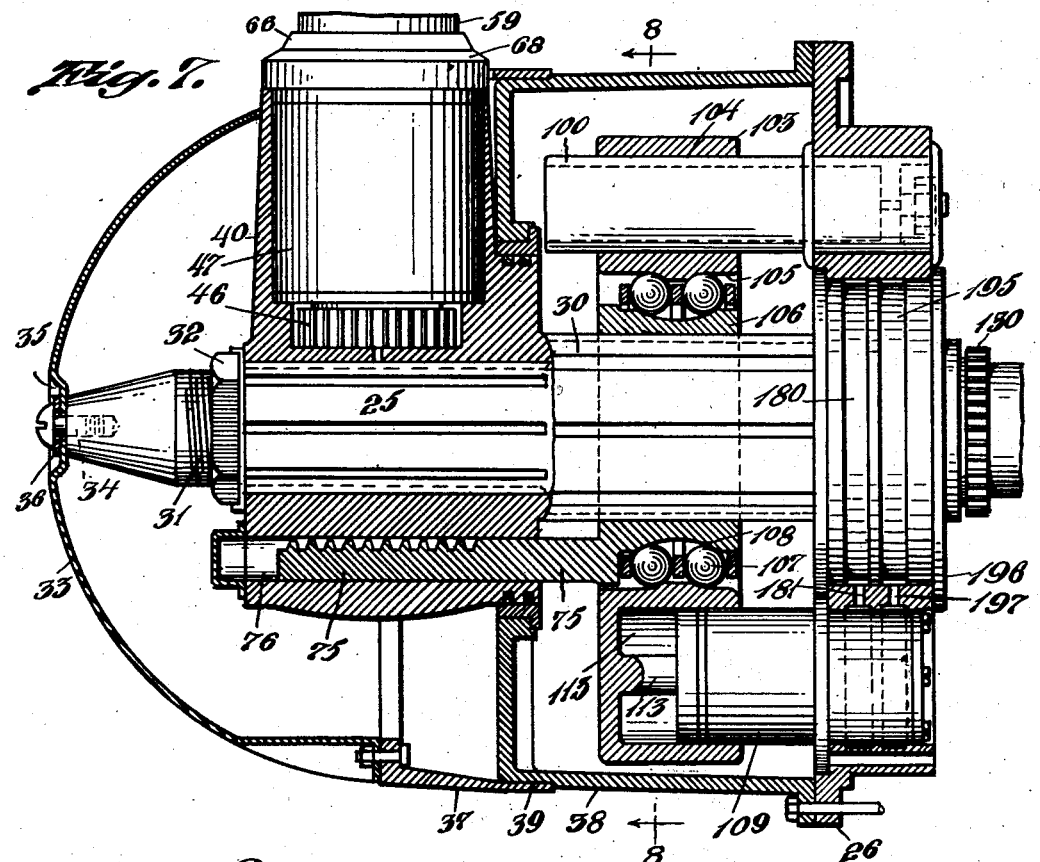
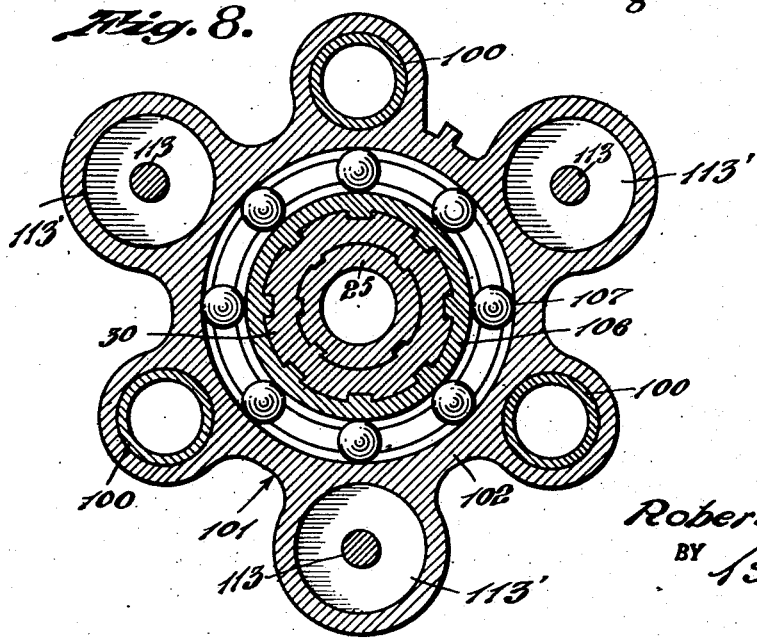

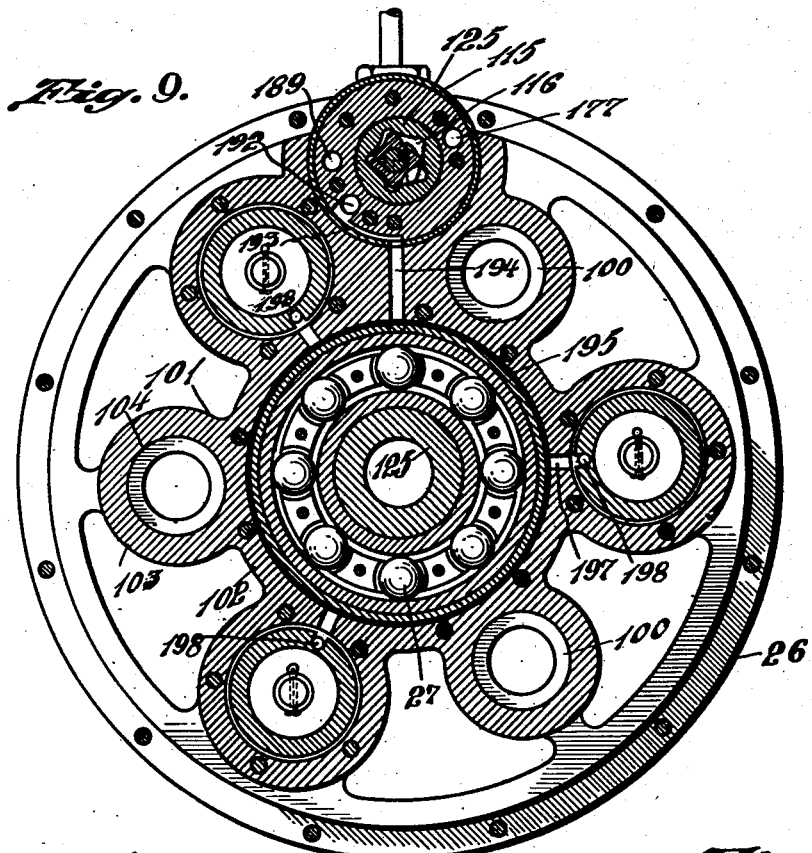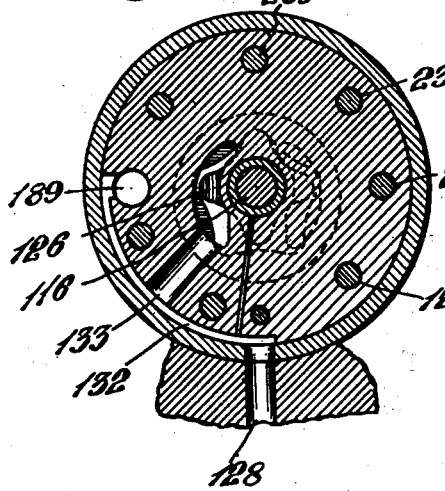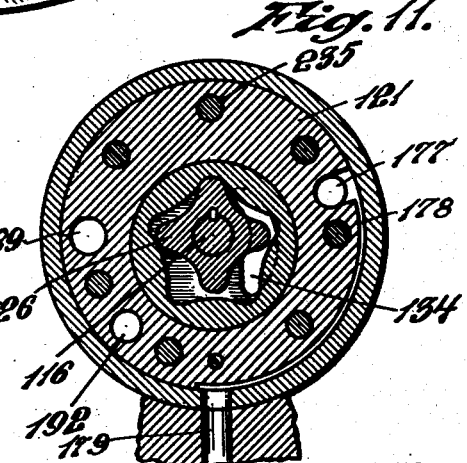

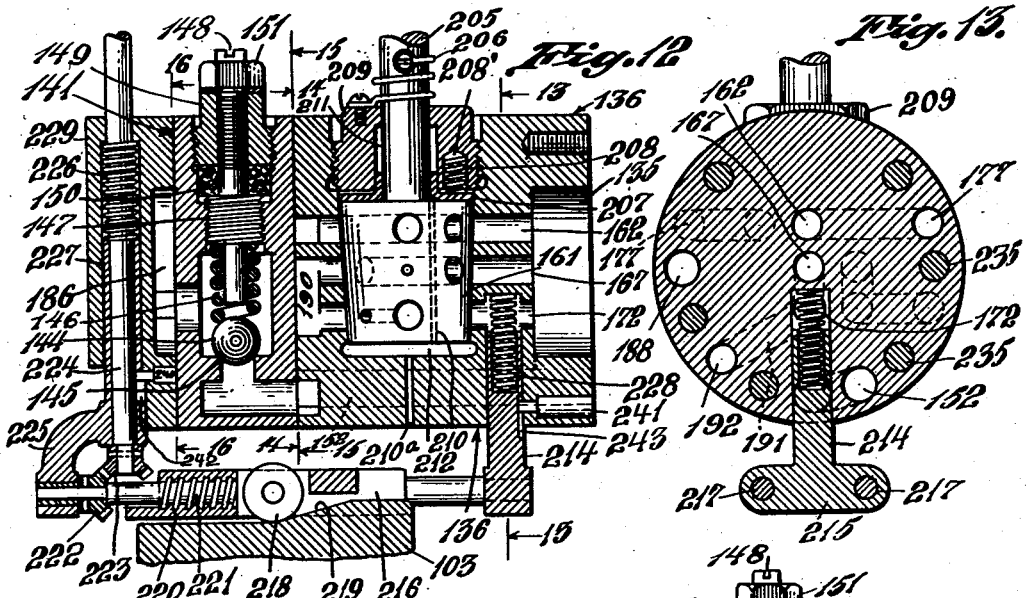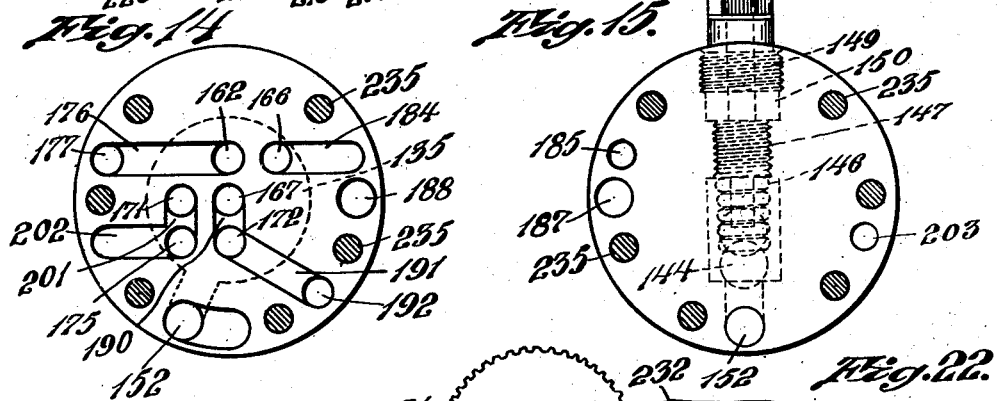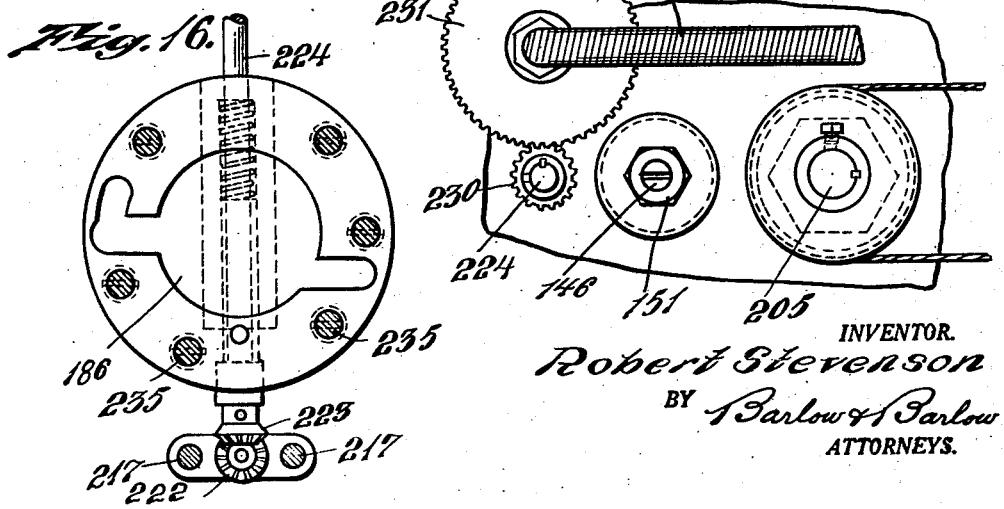

Dec. 12, 1944.   R. STEVENSON   2,364,672
AERIAL PROPULSION
Filed March 6, 1939   7 Sheets-Sheet 7

INVENTOR.
Robert Stevenson
BY Barlow & Barlow
ATTORNEYS.

Patented Dec. 12, 1944

2,364,672

UNITED STATES PATENT OFFICE 2,364,672

AERIAL PROPULSION

Robert Stevenson, Providence, R. I., assignor to Stevenson Engineering Corporation, a corporation of Rhode Island Application March 6, 1939, Serial No. 259,943

9 Claims. (Cl. 170—163)

This invention relates to aerial propulsion, more particularly to a mechanism for changing the pitch of the blades of a propeller, and has for its objects various accomplishments in the improvement of such mechanism. One of the objects of the invention is to provide a mounting for the root of each of the blades of the propellers so that a large part of the mechanism for rotatably mounting the blades for changing the pitch may be assembled prior to placing the blade in the propeller hub.

Another object of the invention is to provide mechanism for changing the pitch of the propeller blades which will be carried inboard from the propeller blades so that the weight of this mechanism may be better supported than were a part of it located on the tip end of the propeller shaft outboard from the propeller.

Another object of the invention is to provide piston means for accomplishing the feathering of the propeller blades and to divide the piston means into a plurality of equally distributed parts arranged circularly of the propeller shaft so that the weight may be better distributed and less chance for vibration due to unequal distribution of weight had.

Another object of the invention is to provide a bearing for the propeller shaft which will be nearer the outboard end of the propeller shaft than mechanisms for accomplishing this result which have heretofore been provided.

Another object of the invention is to move the bearing with the movable means for changing the pitch of the blades so that as the mechanism is moved nearer the outboard end of the shaft the bearing is also moved nearer the outboard end of the shaft for better support of the shaft.

Another object of the invention is to automatically control the flow of the pressure transmitting medium for controlling the pitch of the blades so that a balance between the pressure encountered by the blades and the pressure for changing the pitch may be maintained.

Another object of the invention is to provide a simple control between the pump and the blade pitch changing mechanism so that a variety of different pressures may be transmitted at will to the control mechanism, all without varying the speed or capacity of the pump.

Another object of the invention is to provide a single valve to control the hydrometer pressure for changing the pitch of the propeller blades.

Another object of the invention is to relieve the pressure on the control valve so that its operation may be made more easy.

Another object of the invention is to cause the blade pitch changing forces to act through a ball bearing, a part of which rotates with and moves axially along the propeller shaft for accomplishing the feathering of the blades.

Another object of the invention is to provide a unit pump mechanism which may be located at any desired point either adjacent to or distant from the blade pitch changing mechanism for the supply of oil at various pressures to said mechanism.

With these and other objects in view, the invention consists of certain novel features of construction, as will be more fully described, and particularly pointed out in the appended claims.

In the accompanying drawings:

Fig. 2 illustrates fragmentally the hub of the propeller blade and the details of mounting the root of one of the blades;

Fig. 3 illustrates a section on line 3—3 of Fig. 2;

Fig. 4 is a section on line 4—4 of Fig. 2;

Fig. 5 is a section on line 5—5 of Fig. 2;

Fig. 6 is a fragmental sectional view illustrating a modified manner of mounting one of the propeller blades;

Fig. 7 is a sectional view somewhat similar to Fig. 1 but with various parts removed to better illustrate the supporting mechanism for the shaft and pitch changing mechanism for the propeller blades;

Fig. 8 is a section on line 8—8 of Fig. 7;

Fig. 9 is a sectional view on line 9—9 of Fig. 1, through the rotor of the pump and showing the location of the pump with reference to the supporting mechanism;

Fig. 10 is a section on line 10—10 of Fig. 1;

Fig. 12 is a sectional view through the control valve as shown in Fig. 1 and on a larger scale;

Figs. 13, 14, 15 and 16 are sectional views through corresponding portions shown by section lines in Fig. 12;

Fig. 17 is an enlarged view of the control mechanism in its relation to the pump and relief valve showing in dotted lines certain passages which show the relation of the flow conduits to better bring out their small lines as shown in Figs. 12 to 16 inclusive, heretofore mentioned;

Fig. 21 is a diagrammatical view illustrating the general flow lines diagrammatically which will assist in showing the connecting parts of these flow lines in the control mechanism with the valve in one of its three positions; while Fig. 21a shows diagrammatically the valve in a second position; and Fig. 21b shows diagrammatically the valve in a third position;

Fig. 22 is a fragmental view illustrating one manner of controlling parts of the operating mechanism from the control room of the plane.

Figure 1:
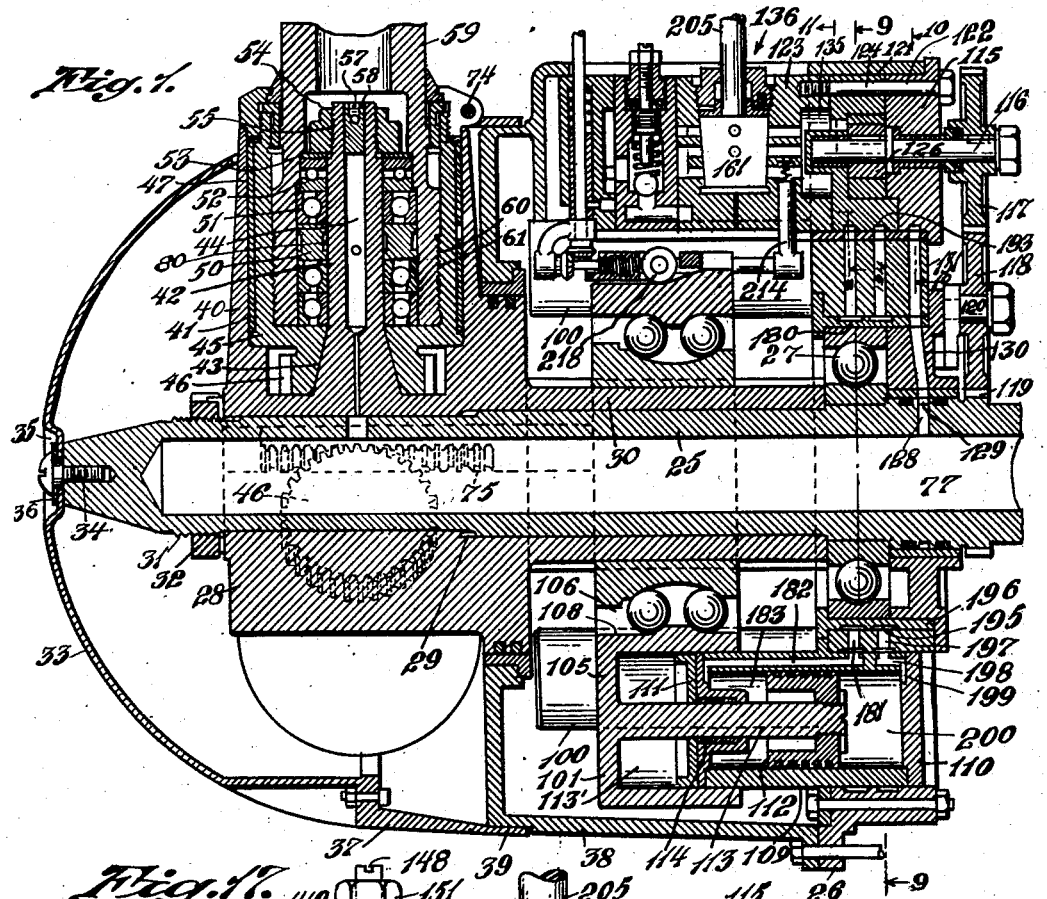
Fig. 1 is a sectional view taken generally centrally and illustrating the various parts of the mechanism consisting of the propeller blade mounting, the blade pitch changing mechanism for the propeller, the oil pump and the valve control between the oil pump and the pitch changing mechanism.

In the use of an air propulsion mechanism, the change of pitch of the blades for the purpose of changing the effective drive of the propeller or for feathering the blades of the propeller to lessen resistance and permit the engine to be more easily held against rotation is desirable and it is found in the attempting of such motions that mechanisms developing strong pressure are required, and thus are of a large size and heavy in their construction. Such mechanisms if placed centrally on the outboard end of the propeller shaft create a weight which may cause throbbing, while if a single cylinder as a force applying unit is positioned inboard of the propeller, it will be to one side of the propeller shaft. I have solved some of the problems as above enumerated in connection with this type of mechanism by locating the means for applying power to change the pitch of the blades on the inboard side of the propeller, and I have split up and distributed this force applying mechanism so that it will be evenly balanced about the shaft. The lubricating oil for the propeller is utilized as the hydraulic medium through which power is applied to change the pitch of the blades of the propeller, and the following is a more detailed description of the present embodiment of this invention, illustrating the preferred means by which these advantageous results may be accomplished:

This apparatus may be considered as a plurality of assembled units cooperating or acting together. There is the propeller blade mounting and assembly, a pitch changing mechanism for the propeller blades, a pump unit which may be located at any desirable place but preferably close by the pitch changing mechanism, and a means for transmitting and controlling the hydraulic power from the pump to the pitch changing mechanism. I will refer to these various portions of the apparatus in substantially the order enumerated.

Propeller blade mounting

It will be understood that I have illustrated merely the outboard end portion of the propeller shaft 25, which extends outward through casing 26 supported by a radial ball bearing 27 therein from a suitable driving mechanism, such for instance as an engine. A propeller hub 28 is mounted upon the propeller shaft 25 by splines 29 at a plurality of different locations. This hub 28 has a collar 30 extending inwardly or inboard of the propeller shaft so as to pronosed cap 33 is secured to the end of the shaft 25 by means of a bolt 34 set into the recess 35 and acting through lock washer 36. This cap embraces the hub portion of the propeller while its skirt portion 37 telescopes over the fixed casing 38 as at 39, as will be apparent from Figs. 1 and 7 of the drawings.

The hub 28 has three bosses 40 extending outwardly therefrom located at equal arcuate distances for the sake of balance. In each of these bosses is mounted the root of one of the propeller blades. Each of these bosses is provided with a bore 41 extending radially, in which bore the root of the blade is rotatably mounted. A central stud 42, integral with the hub, extends upwardly in each bore 41 and is of frustoconical shape at its inner portion 43 while it is provided with a central bore 44 as shown. A rotatable cup 45 is provided with an integral gear 46 at its inner end and has a central opening shaped to fit the conical portion of the stud 43 at its inner end as illustrated in Fig. 2. This cup is also provided with an outer sleeve 47 embracing its outer surface and contacting with the surface of the bore. Two sets of ball bearings 48 and 49 are mounted upon the stud 42 within the cup 45 upon which a collar 50 is mounted and then another two sets of ball bearings 51 and 52 which are all held in position upon the stud 42 against the bottom of the cup through a washer 53 and nut 54 which has threaded engagement as at 55 with the stud 42 and is held in place by pin 56 which in turn is held in place by the set screw 57 extending into a plug 58 set into the top of the stud 42 to close its central bore 44 and provide an oil passage as will be later described.

After the ball bearings are assembled as mentioned, the propeller blade 59 having its root shaped as best illustrated in Fig. 2 and threaded as at 60, is screwed into engagement with the internal threads 61 in the cup 45 while the shoulder 62 engages ball bearing 52 and draws the cup upwardly while formly engaging the other ball bearings and thus through this root of the blade the cup 45 has a ball bearing mounting on the stud 42 for anti-friction rotation with reference to the stud. In order to lock the blade 59 against rotation with reference to the cup 45 the inner surface of the cup is provided with ribs 63, Figs. 4 and 5, and the outer surface of the blade 59 is provided with ribs 64. A flanged ring 65 having ribs on both its inner and outer surfaces is dropped between these two sets of spaced ribs to prevent relative rotation of the blade 59 and the cup 45. A collar 66 engages the outer surface of the blade 59 and is flanged as at 67 while a circular binding member 68 has its flange 69 engaging the flange 67 of the member 66 and by means of threads 70 which engage threads 71 on the upper end of the cup 45, this binding member may draw the collar 66 down tightly against the flanged lock ring 65 to prevent movement of this ring. The locking member 68 is further bound against unscrewing by means of bosses 72 and 73 with a bolt 74 passing through the boss 73 and threaded into the boss 72 for binding this member firmly in engagement. This locking member is thus rotatable with the cup by the turning of the gear 46 through a rack 75 slidable in a suitably shaped channel 76 in the hub.

outwardly through the channel 78 into the bore 44 in the stud 42, thence through the inclined channel 79 into an annular recess 80 and through the channels 81 in the collar 50 to the annular recess 86 and thence by conduit 82 in the propeller blade root and conduit 83 in the cup to the opening 84 in the sleeve about the cup where it will lubricate the relatively movable surfaces between the sleeve 47 and the bore 41 of the boss 40. Lubricant is also distributed through the channels 85 inwardly and outwardly to the ball bearings, that the inner mounting parts of the rotary blade may be lubricated.

In the modified mounting of the propeller blade shown in Fig. 6, a single roller bearing 90 is substituted for the four ball bearings shown in Figs. 1 and 2. This roller bearing is arranged to have its inner raceway 91 in engagement with the inner bottom surface 92 of the rotatable cup 45. A member 93 threadingly engages the threaded portion 94 provided in the modification on the central stud 42 and engages the outer raceway 95 of the roller bearing 90 and securely binds it in position in a manner well known, which also movably secures the rotatable cup 45 to the central stud. The inner end portion of the propeller blade is provided with a bearing lining 96 in the form of a sleeve having a bore of a size to receive the central stud 42 and is conveniently secured in place, such as by a press fit. The threaded portion 60 at the inner portion of the propeller blade threadingly engages differently located threads in the rotatable cup 45, but with the inner end of the blade engaging the member 93 providing a check against any accidental loosening of this member 93. This assembly is otherwise the same as previously described in the preferred form of the propeller blade mounting shown in Figs. 1 and 2.

Blade pitch changing mechanism

In order to rotate the blades 59 to the change their pitch, I have provided a mechanism located on the inboard side of these blades and supported by the fixed casing 38. With reference particularly to Figs. 7 and 9, the fixed casing 38 is provided with three tubular studs 100 located circularly at equal distance or at angles of 120° about the axis of the propeller shaft. These studs extend over the collar 30 of the propeller hub and slidably mount a spider 101 consisting of a circular central portion 102 and outwardly protruding portions 103, each having an opening 104 to receive the studs 100. The spider thus may move in a direction axially of the propeller shaft toward and from its hub.

The spider carries a ball bearing for the propeller hub and shaft comprising an outer ball raceway 105 and an inner ball raceway member 106 splined to and slidable along the collar 30 and rotatable therewith while balls 107 are located between ball raceway 108 of this member 106 and the raceways 105 for anti-friction rotation of the member 106 with reference to the spider 101. The three racks 75 are secured to the member 106 and slide in the channels 76 in the hub. Thus, these racks rotate with the propeller with reference to the outer spider which is mounted upon the fixed studs 100 secured to the casing.

Between the studs 100 and the guided embracing portions 103 of the spider which slide on the studs, I have provided three actuating means for moving the spider axially of the propeller shaft. This means comprises three cylinders each having a wall 109 which is fixed to the casing, as shown in section in Fig. 1 and end walls 110 and 111, while within each cylinder there is a piston 112 with a piston rod 113 secured to the piston 112 and also secured to a spider 101 and, as shown in this drawing, the piston rod is one piece with the spider projecting from a recess 113', which slidably receives the cylinder so as to one guide the other. A suitable packing gland 114 engages this piston rod 113 and provides a tight joint as the piston moves in and out through the wall 111. Thus when these pistons are moved in one direction, the spider with its ball bearing and racks 75 are slid in that direction while, when the pistons are moved in the opposite direction, the same mechanism and racks are moved in the other direction. In order to move these pistons in one direction or the other, I supply oil which I take from the lubricating supply under pressure to one side or the other of the piston, this pressure being developed by a pump which will now be described.

The pump

The pump is a unit utilized for developing the required amount of pressure for operation of the mechanism to vary the pitch of the propeller blades and any suitable device may be used for this purpose, also it may be variously located but as here shown is designated 115 and is located closely adjacent to the control mechanism for the blades so that its conduits may be more advantageously located. The pump is also located in a manner so that it and the control valve will not interfere with the operation of the spider. Its location can best be observed from Figs. 1 and 9.

The drive shaft for the pump is designated 116, which is driven through gear 117 mounted upon this shaft and which obtains its motion through the intermediate gear 118 driven by teeth 119 formed on the propeller shaft. This gear 118 is mounted on a suitable stud 120 secured in fixed relation to the casing 38.

Figure 11:
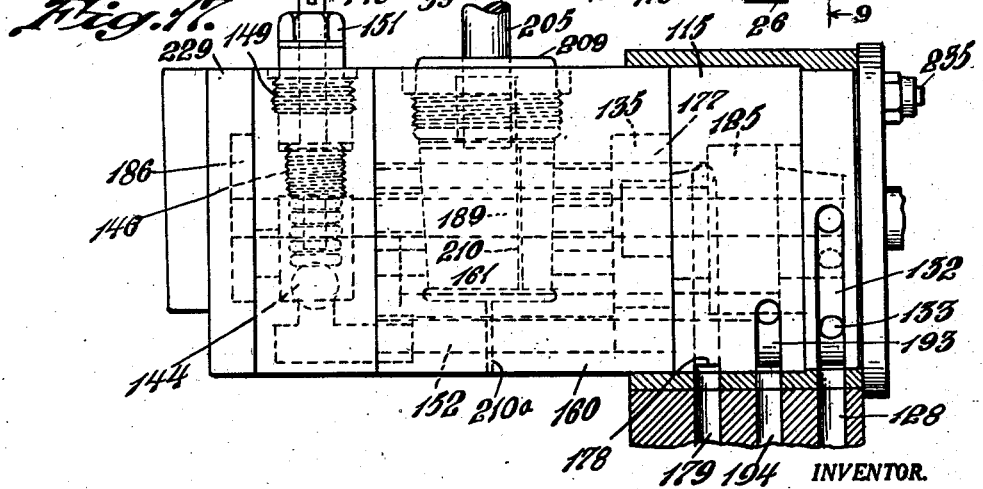
Fig. 11 is a section on line 11—11 of Fig. 1.

The pump casing consists of cylindrical body member 121 and end members 122 and 123 held to the body member by bolts 124. The body and end members are so shaped as to provide the desired cavity within the pump while the end member 122 is bushed to provide a bearing for the shaft 116. This body of the pump, referring to Figs. 9, 10 and 11, has mounted within it a member 125 provided with an opening shaped somewhat in the shape of an internal gear with five recesses. The rotor designated 126 is keyed to the shaft 116 and is provided with four projecting teeth to fit the recesses in the member 125, the arrangement being such that as the rotor rotates the member 125 there is driven or pinched ahead of it from one side to the other the fluid to be pumped as is a known pump function. The intake passage obtains its supply of fluid through the conduit 128 connecting the tubular portion 77 of the drive shaft with the annular recess 129 where the oil is collected and then conducted through suitable fixed members 130 and 131 and delivered to the entering side of the pump through conduits 132 and 133, and thence through the rotors 125 and 126 to the delivery chamber of the pump 134, see Fig. 20, which opens into the collecting chamber 135 of the control valve designated generally 136.

Control valve

In order to control the blade pitch changing mechanism, the fluid from the pump must be controlled in such a way that pressure may be applied in one direction or the other for turning of the blades. This is accomplished by fluid being supplied to the cylinders 109 and controlled by a three-way valve as perhaps may best be understood from the diagram of Figs. 21, 21a, and 21b.

In Fig. 21, the pump 115 is shown as supplying liquid to the opposite sides of the piston 112 controlled by the valve mechanism designated generally 136. The pressure of the liquid developed by the pump is controlled by a relief valve designated generally 141 usually set at 1000 lbs. while the return pressure is controlled by a check valve 142 usually set at 60 lbs.

This pressure relief valve consists of a body 143, see Figs. 12 and 21, and a ball valve 144 held upon its seat 145 by a spring 146 which may be adjusted as to pressure by threaded mechanism 147 suitably adjusted by slot 148 through removable cap 149 and packing 150 and held in position by a check nut 151. The collecting chamber 135 is connected through the conduit 152 to this relief valve 141 and pressure will build up until the ball valve 144 is unseated when the liquid may then return to the intake side of the pump against the 60 pounds pressure through chamber 186 and conduits 187, 188, 189, 132, 133, as will more fully hereinafter appear, thus maintaining the pressure supplied by the pump at a constant regulated amount, usually 1000 lbs.

The three-way control valve 136 comprises a body 160 through which there extends three independent sets of openings with a tapered plug type valve 161 rotatable in the body and extending across said openings to control communication through said sets of openings. The sets of openings may for convenience with reference to the drawings be referred to as upper middle and lower sets. The diagrammatic views, Figs. 21, 21a and 21b, are numbered to correspond with the other views so as to be more easily followed in the description. The elements shown in these Figs. 21, 21a and 21b are diagrammatic in character and are not to be construed as representing the actual structure of the control valve, but, rather as representing so much of the general characteristics of the structure as will enable the operation of the control valve to be understood. The upper set of openings in the body comprise a main conduit opening 162 while the plug valve has a main diametrical conduit 163 and branch conduits 164 and 165, there being provided in the body a conduit 166 to connect with either branch conduit of the valve when positioned to register therewith. The middle set of openings in the body comprises a main conduit 167 while in the valve there is a main conduit 168 and branch conduits 169 and 170, there being provided in the body a conduit 171 to connect with either branch conduit of the valve which may be positioned to register therewith. The lower set of openings in the body comprises a main conduit 172 while in the valve there is a main conduit 173 and a branch conduit 174, there being provided in the body a conduit 175 to connect with said branch conduit when registry is had.

The conduit 162 is connected to one end of the cylinder 109 by passageways comprising groove 176 (see Figs. 14 and 18), thence through passage 177, connecting with a segment of an annular groove 178 in the pump body from which passage 179 extends to annular groove 180 (Fig. 7), passage 181, thence through the cylinder wall conduit 182 (Fig. 1) to the outboard side 183 of the cylinder. The conduit 166 is connected to the low pressure side of the pump by passages comprising groove 184 (Fig. 18), passage 185, provided in the body of the relief valve, connecting with annular chamber 186 (see Figs. 16 and 19), thence through passages 187 and 188 (Fig. 19), passageway 189, conduit 132, and conduit 133 (Fig. 10) opening into the intake side of the pump. The conduits 167 and 172 are connected together by passage 190 (Fig. 14) and thence to the other end of the cylinders by passages comprising groove 191 (Figs. 13, 14, 19 and 20), conduit 192 (Figs. 19 and 20), segment of annular groove 193 in the pump portion, communicating with passage 194 (Figs. 17, 19, and 20), thence through the annular groove 195 (Figs. 1 and 7) in the fixed member 196, passage 197 into the communicating conduit 198 in the cylinder wall, thence through groove 199 into the inboard side 200 of the cylinder. The conduits 171 and 175 are connected together by passage 201 (Fig. 14) and then to the passage returning to the intake side of the pump by groove 202 (Figs. 19 and 20), passage 203 provided in the body portion of the relief valve 141 having connection with annular chamber 186, and thence to the intake side of the pump as by conduits above described 187, 188, 189 and 132. A stem 205 (Fig. 12) extends from the plug valve 161 and is provided with a spring 206 to cause the valve to return to a position such as shown in Fig. 21b, which is a position of normal flight. This valve is sealed against leak through a plate 207 forced inwardly by three springs 208 seating in recesses 208' in a threaded cap 209 which is threaded into the valve body. The plug valve 161 is provided with a bleeder 210 extending parallel to the axis and as shown in Figs. 12, 18, 19 and 20 so that any fluid which may leak about the upper end of the stem into the recess 211 may escape through the bleeder 210 to the recess 212 at the inner end of the plug valve and may escape from this recess 212 through bleeder 210a into the casing which connects with the engine pump.

The valve 161 has three positions. One of these positions is illustrated in the diagram of Fig. 21, this diagram showing separately the three sets of openings in the valve with the opening 163 of the upper set of openings permitting full transfer of fluid through the opening 162 in the body of the valve which is transmitted through the conduits 177, 178, 179, 180, 181, 182 to the outboard side 183 of the piston 112 to cause this piston to move inwardly for revolving of the propeller blade. At the same time fluid on the other side of the piston in chamber 200 is forced back to the intake side of the pump through conduits 199, 198, 197, 195, 192, 191, 190, 167, 170, 168, 171, 201, 202, 203, 185, 189, 132, 133, 128, which may be very easily followed in the diagrammatic showing in Fig. 21.

If now we assume that the valve 161 is turned through 45°, the relative positions of the sets of openings will be as shown in Fig. 21a, in which case the fluid will pass through the body opening 167 and valve opening 168, thence through the passages traced as follows: 190, 191, 192, 195, 197, 198, 199, to the inboard side 200 of the piston to force the piston outwardly for the revolving of the propeller blade and as this movement occurs the fluid in the cylinder on side 183 of the piston will be extruded to the low pressure side of the pump through passages 182, 181, 180, 179, 178, 171, to the valve, thence through 162, 164, 163, 166, in the valve, and then through passages 184, 185, 186, 189, 132, 133, and 128 to the low pressure side of the pump.

If now the valve is turned through a further 45° or 90° from the position shown in Fig. 21 so that its sets of openings are in the position shown in Fig. 21ᵇ, the fluid will be passed through the opening 172 in the body by means of the connection 173 thence throughout passages 190, 191, 192, 195, 197, 198, 199, to the inboard side 200 of the piston, to force the piston outwardly for the revolving of the propeller blade and as this movement occurs, the fluid in the chamber 183 will be extruded to the low pressure side of the pump through passages 182, 181, 180, 179, 178, 177, to the valve, thence through 162, 164, 163, 166, in the valve, and then through passages 184, 185, 186, 189, 132, 133 and 128 to the low pressure side of the pump.

In the positions of the valve shown in Fig. 21ᵃ, there is of course 1000 pounds delivered into the conduit 167 but as there is a bleeder 169 from this conduit which connects with the conduit 171 and thence back to the low pressure side of the pump through conduits 201, 202, 203, 132, 133 and 128, a certain amount of this force, 1000 pounds, will be delivered through the bleeder 169 and consequently there will be less than the 1000 pounds of force delivered to the chamber 200 at the inboard side of the piston. The size of this bleeder will govern the amount of pressure which is applied and the opening 169 is of a size so that approximately 400 pounds will be delivered to the piston in the position of the valve diagrammatically illustrated in Fig. 21ᵃ. The lower set of openings has a bleeder control 174 which is larger than the bleeder 169 and so arranged as to size that but 200 pounds will be delivered to the inboard side of the piston at 200. This bleeder 174, of course, connects with the opening 175, thence to channel 201, and as before stated, through passages 202, 203, etc., back to the inboard side of the pump.

The lower set of conduits of the control valve are those utilized for the usual running position of the propeller when the airplane is in flight, and it is desired to maintain an automatic adjustment of the pitch dependent upon pressures encountered during flying conditions. Accordingly, a control of the pressure passing through this lower conduit coupled with the blade moving mechanism is provided, which consists of a gate valve 214, which may be moved across the opening 172. This gate 214 is provided with a head 215 (Fig. 12) at its end nearest the propeller shaft which is connected to a carriage 216 by a pair of rods 217, on which the carriage 216 is slidably mounted. This carriage has a roll 218 which engages the cam 219 formed on the surface of the motion transmitting element 103. This carriage is supported on its opposite side through a shaft 221 by which the carriage may be moved with reference to the cam surface; a threaded recess 220 is provided in the carriage into which the screw 221 may extend. This screw may be rotated to move the carriage with reference to the cam surface so that this cam may be at varying locations with reference to the total movement of the spider 103. The cam 219 will cover a range of approximately thirty degrees of shift of pitch of the propeller and by arrangement from the cockpit this thirty degrees of shift may be selected at any point along a range of some sixty degrees of shift of pitch; for instance, the range might be made automatic between twenty and fifty degrees or between forty and seventy degrees. Upon the shaft of the screw 221, there is a beveled gear 222 which meshes with the beveled gear 223 secured to shaft 224 for the transmission of motion. These shafts carrying these beveled gears are mounted on a bracket 225 which is moved downwardly by a spring 226 engaging the sleeve-like form 227 of the bracket at its upper portion which balances the spring 228 engaging the gate valve to move it to open position, both springs exerting some pressure upon the carriage. Pins 240 and 241 engaging suitable recesses 242 and 243 provide for a limit of this motion. This shaft 224 is rotatable in this bracket and sleeve and also in its support 229 and is provided on its upper end with a gear 230 which engages a gear 231 which may in turn be rotated from a flexible shaft 232 extending from the cockpit where it may be manually controlled, or it may extend to some position to be automatically controlled by the engine governor.

Figure 18:
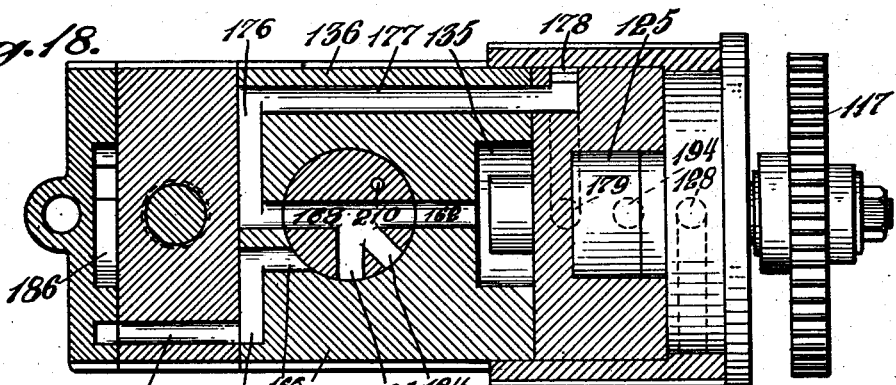
Figs. 18, 19, 20 are sectional views at right angles to the control valve axis respectively through the three sets of openings in the valve.
Figure 19:
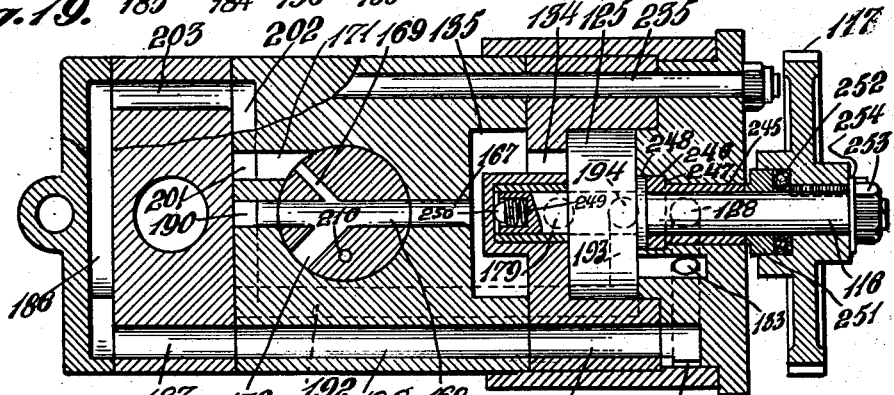
Figure 20:
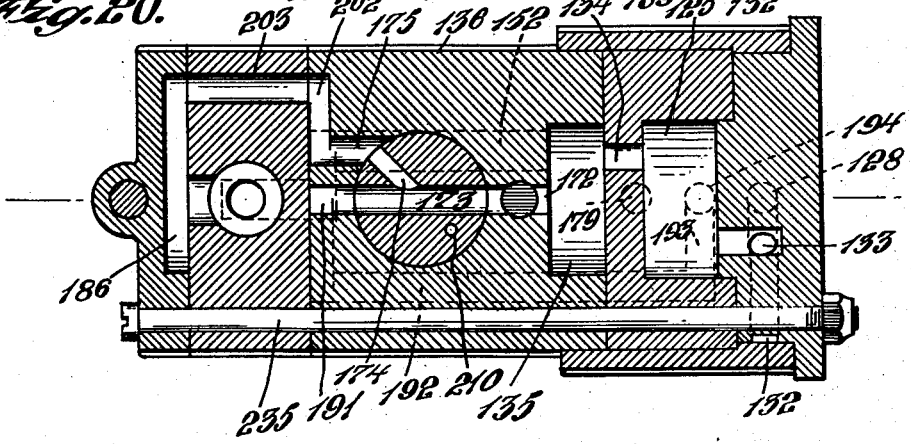

The various parts entering into the assembly shown in Fig. 12 and in Figs. 18, 19, 20, all have circular flat round faces which are placed in abutting relation with bolts 235 passing through the assembly to hold these abutting surfaces in firm engagement. The conduits or passages are some formed in the surfaces which abut for easy access in manufacture, such for instance, as shown in Fig. 14 in the portion of the valve body which abuts against the surface of the portion shown in Fig. 15 of the body of the relief valve, whereby the various conduits such as 176, 184, 191 and 202 are formed. This provides a very simple manner of forming such conduits and also causes these conduits to pass through stationary parts where there is no motion between one part and another part and also through such solid structures that there is no opportunity for crystallization as sometimes happens in thin walled tubes or pipe conduits.

Referring particularly to Fig. 19, the seal for the pump shaft 116 will be noted comprises a bushing 245 with a flange 246 which engages the shoulder 247 of the cover of the pump and is forced against this shoulder by reason of a flange 248 on the shaft 116 which is pressed by spring 249 and ball 250 in a direction to the right as shown in this Fig. 19. A ground fit also exists between a collar 251 which engages the end of the sleeve 245 and while a packing 252 surrounds the shaft and engages this collar preventing any leak which may exist along the shaft from being forced outwardly. This packing engages the gear 117 which is held against outward movement by means of the nut 253 and washer 254 on the end of the shaft and provides a very effective seal for the pump shaft.

Operation of the control system

The pitch of the blade will be considered as zero degrees, when its chord is in the plane of rotation of the propeller, and is movable from this position to a position in which its chord is in a plane through the propeller or substantially at 90 degrees.

In operating an airplane equipped with my invention, after the engine has been set in motion and the propeller blade is revolving in an idling or at zero degrees position, and 1000 pounds of pressure has been developed on the high pressure side of the pump, the valve element 161 is manipulated by means heretofore described to position in registry the conduits 167, 168, and 169, 171, with the other conduits in the valve body 136 and valve element 161 positioned in the relationship to each other shown diagrammatically in Fig. 21ª. The fluid will now be free to flow from the delivery side of the pump through the various connected channels heretofore described, which channels provide a continuous conduit opening into the inboard side 200 of the cylinder 109. A certain amount of fluid flowing through the now registered conduit 167—168 will by-pass through the bleeder conduit 169 now in registry with the conduit 171. The dimension of the bleeder conduit 169 is proportioned to reduce the pressure of the fluid acting on the piston 112 from the 1000 pounds maintained at the delivery end of the pump to approximately 400 pounds. This pressure of 400 pounds will move the piston 112 and the parts operatively connected thereto as hereinbefore described and move the propeller blade at an angle or to a take-off position. During normal flight the resistance to propeller rotation is decreased; and less force is required to increase or maintain the desired angle of propeller setting, and the valve element 161 is permitted to return to a predetermined normal set position by the coil spring 206 fixed to the valve stem 205 and cap 209. At this setting of the valve element 161, the conduit 173 therein is in registry with the conduit 172 in the valve body, and the bleeder conduit 174 is in registry with conduit 175, as shown diagrammatically in Fig. 21b. The conduit 175 is connected by the several connected channels heretofore described and extends to the inboard side of the piston 112. The conduit 175, also through the several connected channels heretofore described, extends to the intake side of the pump. The bleeder conduit in this section of the valve element is so proportioned that the flow of fluid therethrough will be sufficient to reduce the pressure of the fluid on the inboard side of the piston 112 to approximately 200 pounds. There will be in normal flight a varying resistance pressure on the propeller blades which in addition to the 60 pounds' pressure maintained on the low pressure side of the pump will approximately balance the pressure of the fluid acting on the inboard side of the piston 112.

Should the pressure on the propeller blade encountered during flight be such that the pressure on the piston 112 will be sufficient to move the piston 112 to further advance the pitch of the propeller blades, then the movement of the cam surface 219 associated with the piston 112 will engage the roller 218 depending upon its previously set position relative to the cam surface and cause the gate valve 214 operatively connected to the roller to move towards and close or partially close the conduit 172. This distance of movement of the gate valve 214 will of course depend on the amount of movement of the piston 112. This movement of the gate valve 214 will automatically control the amount of fluid passing through the conduit 172 and vary the pressure of the fluid on the piston 112 in accordance with the amount of resistance encountered during flight there being of course a constant flow of fluid through the bypass 174. The automatic valve control will serve to regulate the pitch of the propeller so that the most satisfactory arrangement from the standpoint of engine effort and attainment of economy in operation may be maintained.

Should it be desired or necessary to advance the propeller blades to substantially 90 degrees of pitch during flight, then the valve element 161 will be manipulated to a position to provide a pressure of 400 pounds on the inboard side of the piston which will be sufficient to move the piston to change the propeller blades to the 90 degrees setting. In order to return the propeller blades to a flying pitch, the valve element 161 is manipulated to have the conduits 162 and 163 register. In this setting of the valve element 161, the fluid under the 1000 pounds of pressure will flow through the several connecting channels providing a continuous conduit to the outboard side of the piston 112. This force of 1000 pounds will move the piston and associated parts to return the blades to the desired pitch angle.

In Fig. 21, the valve setting is such as to deliver a fluid pressure of 1000 pounds on the outboard side of the piston 112. The setting shown in Fig. 21ª is arranged to deliver 400 pounds of pressure on the inboard side of the piston 112. The setting of the valve shown in Fig. 21b will deliver 200 pounds on the inboard side of the piston. However, the pressure of 200 pounds will be varied as above described by the automatically controlled gate valve 214.

The foregoing description is directed solely towards the construction illustrated, but I desire it to be understood that I reserve the privilege of resorting to all the mechanical changes to which the device is susceptible, the invention being defined and limited only by the terms of the appended claims.

I claim:

1. In a mechanism for aerial propulsion, a nonrotatable casing having a bearing extending therethrough, a rotary propeller shaft journaled in said bearing, a hub splined to said shaft and having a collar extending therefrom, blade units rotatably mounted in said hub about an axis at right angles to the axis of said shaft, a gear at the inner end of each of said blade units, an element having a ball bearing with the inner raceway portion slidable along said collar and splined thereto, racks carried by said inner raceway and engageable with said gears, guides fixed to and extending from a wall of said casing for supporting and directing the movement of said element, cylinders fixed to and extending from said wall, pistons secured to said element and located in said cylinders, and hydraulic means for operating said pistons in said cylinders.

2. In a controllable pitch propeller, a hub structure, blades rotatably mounted in said hub, a gear at the inner end of each blade, racks operatively connected to said gears and operable to rotate said gears to rotate said blades to change the pitch thereof, means hydraulically operable for operating said racks including a plurality of cylinders each having a piston therein, a plurality of flow conduits opening into each cylinder on either side of said piston, a plurality of bypass conduits each of which may be positioned into and out of alignment with one of the said flow conduits to bypass a portion of the fluid in the conduit aligned with a said bypass to reduce the pressure of the fluid in the said conduit.

3. In a controllable pitch propeller, mechanism for changing the blade angle of said propeller, hydraulic means for actuating the said mechanism including a plurality of flow conduits, a valve having a body portion provided with a plurality of openings therein equal in number to said conduit and forming part thereof, a plug rotatably mounted in said valve and intersecting all of said openings and provided with a plurality of openings therein each of which may be positioned in and out of alignment with one of the openings in the valve body by the rotation of said plug to control the flow of fluid through said conduits, bypasses in said valve body and bypasses in said plug intersecting the openings therein and positioned by the rotation of said plug into alignment with the said bypasses in the valve body to bypass a portion of the fluid from the conduit communicating therewith for controlling the fluid pressure in the said communication conduit.

4. In a controllable pitch propeller, a hub structure, blades rotatably mounted in said hub, a gear at the inner end of each blade, racks engageable with said gears and operable to rotate said gears to rotate said blades to change the pitch thereof, hydraulic means for operating said racks including a plurality of cylinders each having a piston therein, a plurality of flow conduits opening into each cylinder on either side of said piston and means for controlling and varying the pressure of the fluid in each of said conduits comprising a rotatably mounted member positioned to intersect all of said flow conduits and having a plurality of openings therein and rotatable to align said openings with said conduits to bypass a portion of the flow of fluid in said conduit aligned with said opening to vary the pressure of the fluid therein.

5. In a controllable pitch propeller, a hub structure, blades rotatably mounted in said hub, a gear at the inner end of each blade, racks engageable with said gears and operable to rotate said gears to rotate said blades to change the pitch thereof, hydraulic means for operating said racks including a plurality of cylinders each having a piston therein, a plurality of flow conduits opening into each cylinder on either side of said piston and means for controlling and varying the pressure of the fluid in each of said conduits comprising a rotatably mounted member positioned to intersect all of said flow conduits and having a plurality of openings therein and rotatable to align said openings with said conduits to bypass a portion of the flow of fluid in said conduit aligned with said opening to vary the pressure of the fluid therein, and a relief valve communicating with all of said flow conduits.

6. In a controllable pitch propeller having a hydraulically operable mechanism for rotating the blades of the propeller about their own axis to change the pitch thereof including a slidably mounted member operatively connected to said blades to translate rotation of said blades about their axes, a flow conduit extending from the high pressure side of a hydraulic pressure generating means to the said mechanism, a closure element movably mounted to be moved into and out of said conduit, a cam carried and moved by said member, and means operatively connecting said closure element and said cam and actuated by the movement of said cam to move said closure member into said conduit to reduce the flow of fluid therein.

7. In a controllable pitch propeller, a hub structure, blades rotatably mounted in said hub, a gear at the inner end of each blade, a member slidably mounted and having racks therein operably connected to said gears and movable to rotate said gears to move said blades about their axis to change the blade angle of said propeller, hydraulic means for actuating said member including a plurality of flow conduits, a plunger movably mounted for movement in and out of one of said conduits for varying the flow of fluid in the said one of said conduits and means operably connected to said plunger and actuated by the movement of said slidably mounted member for moving said plunger into the said conduit for automatically controlling the flow and pressure of fluid therein upon a predetermined movement of said member.

8. In a controllable pitch propeller, a hub structure, blades rotatably mounted in said hub, a gear at the inner end of each blade, a member slidably mounted and having a racks therein operably connected to said gears and movable to rotate said gears to move said blades about their axis to change the blade angle of said propeller, hydraulic means for actuating said member including a plurality of flow conduits, a plunger movably mounted for movement in and out of one of said conduits and a cam carried by said slidably mounted member, and a cam follower secured to said plunger and engageable by said cam upon a predetermined movement of said member for moving said plunger into the said conduit associated therewith for the automatic control of the flow and pressure of fluid therein.

9. In a controllable pitch propeller, a hub structure, blades rotatably mounted in said hub, a gear at the inner end of each blade, a member slidably mounted and having racks therein operably connected to said gears and movable to rotate said gears to move said blades about their axis to change the blade angle of said propeller, hydraulic means for actuating said member including a plurality of flow conduits, a plunger movably mounted for movement in and out of one of said conduits and a cam carried by said slidably mounted member, and a cam follower secured to said plunger and engageable by said cam upon a predetermined movement of said member for moving said plunger into the said conduit associated therewith for the automatic control of the flow and pressure of fluid therein, and means for relatively adjusting said cam and follower to vary their relative range of operation.

ROBERT STEVENSON.